United States Patent

[11] 3,596,158

[72] Inventor Donald L. Watrous
    Liverpool, N.Y.
[21] Appl. No. 751,489
[22] Filed Aug. 9, 1968
[45] Patented July 27, 1971
[73] Assignee General Electric Company

[54] STABILIZING PHASE CONTROLLED AC INDUCTION MOTORS
8 Claims, 6 Drawing Figs.
[52] U.S. Cl. .................................................. 318/227,
    318/230, 318/345
[51] Int. Cl. ................................................... H02p 5/40
[50] Field of Search .......................................... 318/227,
    230, 345

[56] References Cited
UNITED STATES PATENTS
3,192,462 6/1965 James .......................... 318/227 X
3,403,315 9/1968 Maynard ...................... 318/227
3,441,823 4/1969 Schlabach .................... 318/227 X
3,443,188 5/1969 Mortimer ..................... 318/227 X Primary Examiner—Oris L. Rader
Assistant Examiner—Gene Z. Rubinson
Attorneys—John F. Ahern, Paul A. Frank, Donald R. Campbell, Frank L. Neuhauser, Oscar B. Waddell and Melvin M. Goldenberg ABSTRACT: An adjustable speed capacitor run or polyphase AC induction motor energized by phase controlled voltage is stabilized by an AC phase control circuit whose timing is referenced to the zero crossing of the capacitor voltage in an RC circuit and supplies gating signals to a thyristor in series with the motor, characterized by a degenerative feedback circuit comprising an impedance element connected to modify the capacitor voltage in such manner that the cessation of thyristor conduction modulates the timing of the next gating signal.

Inventor:
Donald L. Watrous,
by Donald R. Campbell
His Attorney.

Fig. 3.a
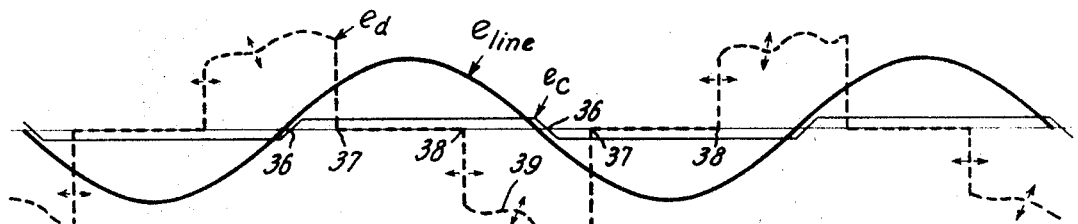
WAVESHAPES WITH SWITCH OPEN
Fig. 3b
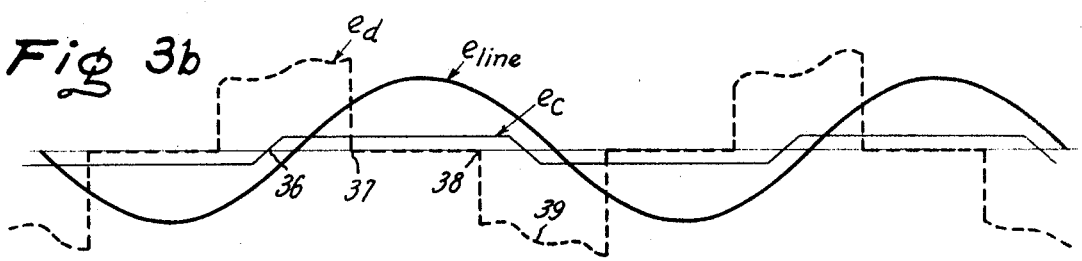
WAVESHAPES WITH SWITCH CLOSED
Fig. 4.
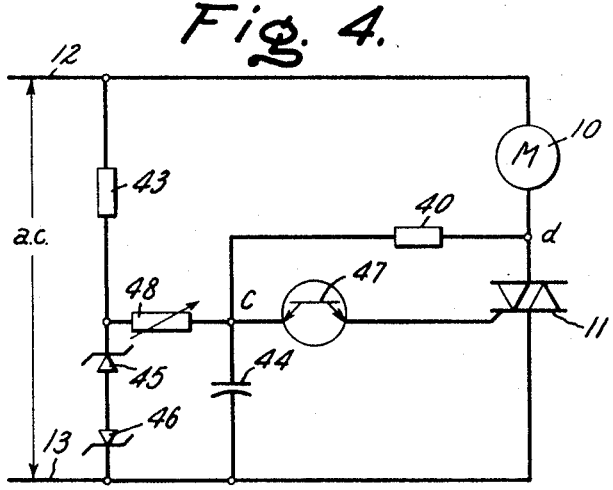
Fig. 5.
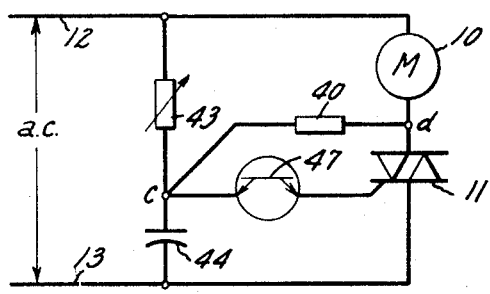
Inventor:
Donald L. Watrous,
by Donald R. Campbell
His Attorney.

STABILIZING PHASE CONTROLLED AC INDUCTION MOTORS

This invention relates to stabilizing AC induction motors energized from phase controlled voltage, and more particularly to a motor control circuit for an adjustable speed single phase capacitor run or polyphase AC induction motor for supplying phase controlled voltage to the motor in such manner that the motor runs smoothly.

An effective way of adjusting the speed of a standard AC induction motor is to control the voltage supplied to the stator windings, and this is conveniently accomplished by phase controlling the line voltage. In the usual arrangement, a controlled solid state switching device such as a thyristor is connected in series circuit relationship with the stator windings of the motor, and the switching device is rendered conductive in each half cycle at a selected phase of the line voltage. The switching device remains conductive for the remainder of the half cycle of alternating current line voltage, and is turned off when the current through the device drops below the holding value. The average level of the voltage delivered to the motor windings will then vary in accordance with the conduction angle of the switching device and the operating conditions of the motor. This type of phase control is inexpensive because it is not necessary to provide commutating circuits for the thyristors, if thyristors are used as the switching devices, and is effective to produce a wide voltage range to control the speed of the motor.

Some capacitor run small AC induction motors and conventional polyphase induction motors, however, exhibit an instability when energized from phase controlled voltage. A single phase capacitor run induction motor, briefly stated, is one having quasi two-phase stator windings one of which is associated with a permanently connected series capacitor to change the phase of the current in that winding relative to the current in the other winding for starting and running purposes. The instability that has been noted produces torque pulsations, braking torque, audible noise, and increased losses. In order to remove the instability the present method is to increase the air gap between the rotor and the stator windings to decrease the magnetizing reactance of the motor. This reduces the motor performance and is undesirable because there is less usable horsepower for a given frame size.

Accordingly, an object of the present invention is to provide an improved motor control circuit for an adjustable speed AC induction motor energized by phase controlled voltage.

Another object is the provision of an AC phase control circuit for a capacitor run or polyphase induction motor embodying a technique for stabilizing the operation of the motor.

Yet another object is to provide an economical adjustable speed drive system comprising an AC motor which is supplied with a variable voltage by means for a series connected thyristor and a phase control circuit therefor characterized by a degenerative feedback path to assure smooth running of the motor.

In accordance with the invention, a stabilized adjustable speed drive system comprises a power circuit including an AC motor and bidirectional conducting thyristor means or other suitable controlled solid state switching means connected in series a circuit relationship across a source of alternating current electric power. A phase control gating circuit for applying gating signals to the thyristor means to initiate conduction thereof is, broadly speaking, responsive to means for sensing the voltage of the power source, means for sensing an electrical parameter in the power circuit such as the voltage across the thyristor means, and means for providing a predetermined control signal to adjust the timing delay. Although the invention can be practiced with a variety of phase control circuits, the phase control gating circuit is preferably an integrated circuit phase control gating circuit whose timing reference is provided by the voltage across a capacitor in an RC circuit which is substantially in phase with the power source voltage. Degenerative feedback means comprising an impedance element is effectively coupled to a junction between the motor and thyristor means for modifying the capacitor voltage, and therefore the timing reference, as a function of the period of conduction of the thyristor means in a previous half-cyle. In this way the periods of conduction of the thyristor means and the phase angles of the gating signals are substantially equal and the motor is stabilized.

The foregoing and other objects, features and advantages of the invention will be apparent from the following more particular description of several preferred embodiments of the invention, as illustrated in the accompanying drawings wherein:

FIGS. 3a and 3b are the voltage waveshapes obtained at various points in the FIG. 1 circuit when (a) the switch is open and there is no degenerative feedback path, and (b) the switch is closed and stabilized motor operation is achieved; and FIG. 4 and 5 are schematic circuit diagrams of other types of phase control circuits modified to have a degenerative feedback circuit.

Figure 1:
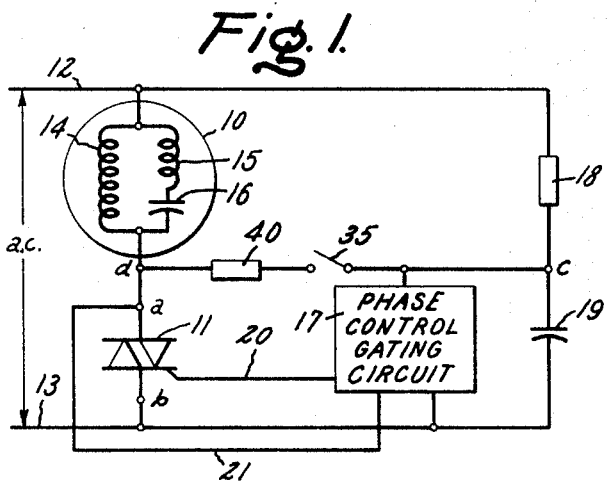
FIG. 1 is a simplified schematic circuit diagram of a capacitor run AC induction motor and phase control circuit constructed in accordance with the teaching of the invention.

In FIG. 1 is shown a single phase capacitor run AC induction motor 10 connected in series circuit relationship with a solid state triac device 11 across a pair of alternating current power supply terminals 12 and 13. As has been mentioned, the induction motor 10 comprises a pair of stator windings 14 and 15 wound two-phase and effectively connected in parallel circuit relationship with one another. In order for the current in one of the motor windings to be at a different phase angle than the current in the other motor winding for starting and running purposes, a capacitor 16 is connected in series circuit relationship with one of the windings, such as the winding 15. Although energized from a single phase source of alternating current power, the motor 10 in effect runs two-phase. The capacitor run AC induction motor is well known in the art, and is commonly made in the smaller motor sizes in the range of about one-third to 5 hp.

The triac 11 is a bilateral triode thyristor having a pair of load terminals *a* and *b* and a gate electrode to which a gating pulse is applied when it is desired to render the device conductive. The device has bidirectional conducting characteristics and can be turned on at the beginning of each half cycle of the AC supply or at a selected phase retard angle, and remains conductive until the current through the device drops below the holding value. The full value of the AC voltage impressed across the power supply terminals 12 and 13 is supplied to the motor 10 when the triac 11 conducts for a full 180° of each half-cycle of the supply current, however when the triac device 11 is rendered conductive for less than a full 180° in each half-cycle, the average voltage delivered to the motor 10 is usually reduced as the phase retard angle increases. By energizing the motor 10 with phase controlled voltage in this manner, the speed of the motor 10 can be adjusted over a wide range, the maximum speed occurring when full voltage is supplied to the motor.

Gating pulses are supplied to the triac 11 by a suitable AC phase control circuit, and in the preferred embodiment it comprises a monolithic integrated phase control gating circuit which derives its power from an RC circuit connected across the AC power supply terminals 12 and 13 and including a series connected resistor 18 and capacitor 19. During each half cycle of the AC supply, the capacitor 19 is charged through the resistor 18, and the input terminals of the phase control gating circuit 17 are connected across the capacitor 19. The timing of the phase control gating circuit 17 begins when the voltage at the junction point *c* between the resistor 18 and capacitor 19 goes through zero, or more correctly when the voltage across capacitor 19 passes through zero, and at an adjustable time after the timing zero corresponding to the selected phase angle, a gating pulse is applied to the gate electrode of the triac 11 connected to the output of the gating circuit 17 by conductor 20. Load terminal $a$ of the triac device 11 is connected by means for conductor 21 to inductive logic within the phase control gating circuit 17 to prevent the application of a gating pulse to the triac 11 when it is conducting.

Figure 2:
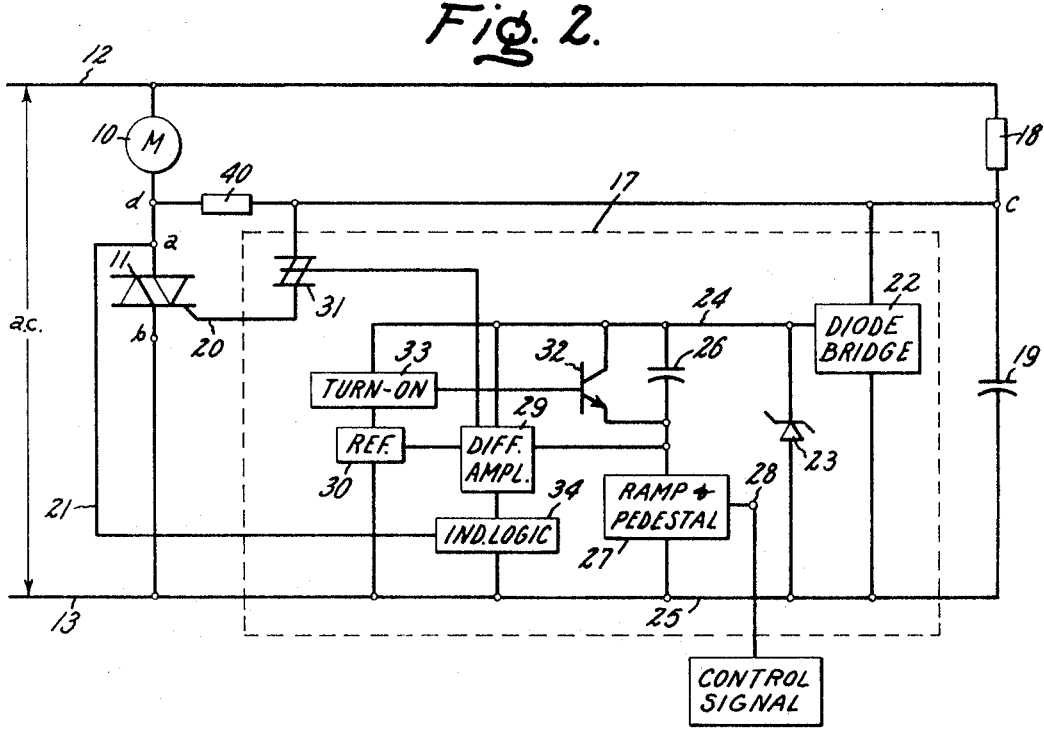
FIG. 2 is a more detailed diagram of a suitable phase control gating circuit shown in block form in FIG. 1, together with its connections to the other circuit elements shown in FIG. 1.

The phase control gating circuit 17 is conveniently the PA436 integrated circuit phase control, and is described in preliminary specification sheet No. 85.31, dated Mar. 1968, available from the Semiconductor Products Department, General Electric Company, Electronics Park, Syracuse, New York 13201. Although a complete understanding of the PA436 phase control circuit is not believed to be necessary, a functional block diagram of the integrated circuit is given in FIG. 2 as an aid to understanding the shape of the waveforms to be explained later with regard to FIG. 3. In FIG. 2 operating voltage for the phase control circuit is obtained through the resistor 18 and a diode bridge rectifier 22, and the DC voltage obtained in this manner is clipped to the desired level by a Zener diode 23 connected across the DC power supply terminals 24 and 25. A timing capacitor 26 is charged through a ramp and pedestal circuit 27 connected in series circuit relationship with the timing capacitor across the DC supply terminals 24 and 25. A control signal supplied through an input 28 to the ramp and pedestal circuit 27 determines the level of the pedestal voltage applied to the timing capacitor 26, and thus adjusts the phase angle of the generated gating signal. A differential amplifier circuit 29 compares the voltage across the timing capacitor 26 with a reference voltage derived in a reference circuit 30, and when the timing capacitor voltage exceeds the reference voltage, an output signal is applied to the gate electrode of a silicon bilateral switch 31, rendering it conductive. The silicon bilateral switch actually comprises two miniature silicon controlled switches connected in inverse-parallel, and operates as a switch with both polarities of applied voltage. When the switch 31 is turned on, the capacitor 19 discharges through the gate electrode load terminal $b$ circuit of the triac device 11. In this way, a gating pulse is applied to the gate electrode of the triac and the triac 11 conducts current in the direction determined by whether the load terminal $a$ or the load terminal $b$ is positive with respect to the other terminal.

An important feature of the monolithic integrated phase control circuit 17 is that the timing for the phase angle delay for turning on the switch 31, which in turn triggers the gating pulse for the triac device 11, starts when the capacitor 19 passes through the zero voltage point during each half-cycle when the capacitor voltage changes polarity. The mechanism within the PA436 integrated circuit that assures this mode of operation includes a shunting transistor 32 having its emitter and collector electrodes connected respectively to the opposite plates of the timing capacitor 26, and its base electrode connected to a turn-on circuit 33 for applying a turn-on potential to the transistor 32 when the voltage across the capacitor 19 passes through the zero point. In the PA436 circuit the turn-on circuit 33 and the reference potential circuit 30 for the differential amplifier 29 actually comprise a plurality of series connected voltage divider resistors connected across the low voltage DC power supply terminals 24 and 25. When the voltage across the capacitor 19 is zero, it can be seen that the voltage across the DC power supply terminals 24 and 25, and hence of the turn-on circuit 33, will also be zero. The transistor 32 is thus rendered conductive and discharges the timing capacitor 26, preparing it for the next half-cycle of operation. The previously mentioned conductor 21 between the load terminal $a$ and the phase control gating circuit 17 is connected to an inductive logic circuit 34 within the integrated circuit which inhibits the differential amplifier 29 when the triac 11 is conducting, i.e., when no enabling current flows in the conductor 21. The circuitry prevents premature gating of the triac 11 when used with inductive loads, and establishes a minimum triac blocking voltage before gating. It might be mentioned in addition that the PA436 phase control integrated circuit is made entirely of diodes, transistors, and resistors, and functions nearly symmetrically on each half cycle of the AC supply voltage.

In order to define the electrical characteristics of the motor instability which arises when the motor control circuit of FIG. 1 is connected as the usual AC phase control circuit for gating a bidirectional conducting thyristor connected in series circuit $e_c$ with the motor 10, let it be assumed that the switch 35 in FIG. 1 is open. The timing constant of the RC circuit comprising the series connected resistor 18 and capacitor 19 is relatively short, such that the phase shift across the capacitor 19 at the point $c$ is negligible as compared to the phase of the line voltage, and the two can be said to be substantially in phase. For example, for a 117 volt, 60 Hz. source, the resistor 18 is 10K ohms and the capacitor 19 is 0.05 microfarads. Referring to FIG. 3$a$, the voltage waveform $e_c$ at the point $c$ is clipped due to the Zener diode 23 within the phase control gating circuit 17, and crosses the zero voltage ordinate at the point 36 substantially in phase with the sinusoidally varying line voltage $e_{line}$. The voltage at the junction point $d$ in FIG. 1 between the motor 10 and the triac device 11 is indicated by the waveform $e_d$. The gating pulse generated at point 37 occurs at an adjustable time after the capacitor voltage $e_c$ or the line voltage passes through zero, and the triac 11 begins to conduct. While the triac 11 is conducting, all the voltage appears across the motor 10 and none appears across the triac until the point 38 at which it is rendered nonconductive due to the current through the device falling below the holding current. At this time the voltage at the point $d$ rises rapidly due to the rapid increase in the blocking voltage of the triac 11 and has an oscillatory value as indicated by the curve segment 39. The triac blocks until the corresponding point 37 in the next half cycle is reached at which time the triac is rendered conductive. As is shown by the double arrow symbol on the portion of the waveform $e_d$ representing the rapidly rising triac blocking voltage at point 38, the period of conduction of the triac 11 from half-cycle to half-cycle is not stable and tends to oscillate in some roughly periodic manner about an average value at which the triac becomes nonconductive. In an analogous manner, the curve portion 39 representing the blocking voltage across the triac 11 is changeable from half-cycle to half-cycle but usually has the form of an oscillatory curve as is illustrated.

It is evident from an inspection of the waveforms shown in FIG. 3$a$ that the phase angle of turn on of the triac 11 (point 37) when once adjusted to a preselected value is fixed or steady with respect to the zero line voltage crossing point (point 36) in each succeeding half cycle. The period of conduction of triac 11 in each half cycle, on the other hand, is variable because the point 38 at which the triac is rendered nonconductive changes from half-cycle to half-cycle, although it does appear to have an average value. The physical manifestation of these electrical characteristics is that capacitor run AC induction motors exhibit an instability when energized from phase controlled voltage supplied by the usual type of AC phase control circuit (switch 35 is assumed to be open). The instability results in torque pulsations and the production of audible noise. The exact reasons for the electrical characteristics which produce this mechanical instability, and in particular for the shape of the waveform $e_d$, are not known with certainty. It is believed, however, that a reasonable explanation is that the two motor windings 14 and 15 and the series connected capacitor 16 in combination comprise an oscillatory circuit having a period substantially different from that of the line voltage appearing across the AC power supply terminals 12 and 13. Since the current in this closed oscillatory loop is circulating at a rate unrelated to the source current and voltage, it is to be expected that the current through the power series circuit comprising the motor 10 and triac 11 will drop below the holding value of triac 11 at a different point in each half cycle as measured from the zero crossing of the line voltage. Consequently, the period of conduction of the triac from half cycle to half cycle is not constant. Because of this same phenomenon, the blocking voltage across the triac 11, see the curve segment 39 in FIG. 3, shifts from half cycle to half cycle with an oscillatory waveshape.

In accordance with the teaching of the invention, the induction motor 10 is stabilized by the connection of a degenerative feedback circuit between the points d and c in FIG. 1. This is accomplished preferably by the connection of a resistor 40 directly between the points d and c (the switch 35 is assumed closed). In some cases a series-shunt RLC network may be used. The effect of adding the feedback impedance element 40 is that in addition to being charged by the current through the resistor 18, the capacitor 19 is also charged through the impedance element. There is current through the impedance element 40 only when the triac is blocking, see FIG. 3b, and it is evident from the waveform $e_d$ that this additional charging current is leading with respect to the charging current through the resistor 18 which can be assumed to be almost in phase with the line voltage in view of the relatively short timing constant of the RC circuit comprising the resistor 18 and capacitor 19. Since the additional feedback current leads the current through resistor 18, it is to be expected that the zero crossing point of the capacitor voltage at point c in each half cycle will be leading the line voltage. This is illustrated in FIG. 3b where the zero crossing point 36 of the waveform $e_c$ is now leading with respect to the zero crossing point of the line voltage waveform $e_{line}$. The amount of additional charging current through the feedback impedance element 40 is furthermore dependent on the length of triac conduction in the preceding half cycle. When in the preceding half cycle, the triac 11 conducts for a period longer than an average value, then the additional charging current is also greater and the zero crossing point 36 of the capacitor voltage tends to be advanced. On the other hand, when the period of conduction of the triac in the preceding half cycle is shorter than the average value, then there is less additional charging current through the feedback path and the zero crossing point 36 is less leading with respect to the zero crossing point of the line voltage. The effect of the feedback path is, then, degenerative. By choosing the proper amount of feedback, the triac voltage waveform $e_c$ can be made stable and repeat from cycle to cycle. As a result, the torque pulsations and audible noise are greatly reduced. The value of the feedback impedance element 40 appears to be quite noncritical, and for the example previously given element 40 is a resistor that can be varied from 18K to 33K ohms with satisfactory results.

With the proper amount of degenerative feedback, waveshapes of the type shown in FIG. 3b are obtained. The periods of conduction of the triac 11 are approximately equal, i.e., the lengths between the points 37 and 38 in each half cycle are about equal. Moreover, the zero crossing point 36 of the capacitor voltage $e_c$ is at the same point in each half cycle with respect to the line voltage, so that the phase at which the triac becomes conductive (point 37) is approximately constant. With equal triac conduction periods and equal phase angles at which the triac is rendered conductive, it is apparent that the phase controlled voltage supplied to motor 10 is constant from cycle to cycle and results in a smooth running motor. Comparing FIG. 3b with FIG. 3a, it is seen that the point 38 in FIG. 3b is now at a substantially constant point, and the curve segment 39, although having an oscillatory waveshape, does not shift in the manner previously explained.

Several variations upon the circuit of FIG. 1 are readily conceived. The triac 11 may be replaced by other types of bidirectional conducting thyristor devices such as a pair of inverse-parallel silicon controlled rectifiers or a diac device. The silicon controlled rectifier is a unidirectional triode thyristor which, like the triac device, has a gate electrode to which a gating pulse is applied when it is desired to render the device conductive. The diac, on the other hand, does not have a gate electrode and is rendered conductive by applying a high voltage pulse or a high dv/dt pulse across its load terminals or by increasing the DC voltage to a sufficiently high level. Appropriate circuit modifications would be made to satisfy these changed gating requirements. The controlled solid state switches may also be transistors if suitable circuit changes are made. Instead of connecting the degenerative feedback path to change the voltage at the point c, it is also possible to leave the voltage at the point c undisturbed, this being the reference voltage for the timing of the phase control gating circuit 17, and instead modify an appropriate element or group of elements within the phase control gating circuit 17 to achieve the same degenerative feedback effect. This will not be explored in detail since it is not considered to be as desirable.

FIGS. 4 and 5 show other types of AC phase control circuits made of discrete components which are modified to include a degenerative feedback path for motor stabilization. These circuits are modifications of the standard full wave phase control circuits described in paragraph 9.4.2 of the SCR Manual, 4th Edition, published by the General Electric Company, and available from the same address as given previously. In FIG. 4, the timing circuit comprises the series connected resistor 43, adjustable resistor 48, and capacitor 44, and the voltage at the junction point between resistors 43 and 48 is clamped for each polarity of the AC supply by a pair of back-to-back Zener diodes 45 and 46. The switch device 47 in this case is a signal diac or bilateral trigger diode which is switched into conduction when a triggering voltage of either polarity is exceeded. The operation of this type of phase control circuit is well known, and when the value of the voltage at the point c exceeds the triggering voltage for the device 47, the switch device 47 is rendered conductive and applies a gating signal to the gate electrode of the triac device 11, turning it on. The feedback impedance element 40 connected between the points d and c similarly modifies the voltage at the point c in a degenerative manner, shifting the phase at which the signal diac device 47 is turned on in such manner as to stabilize the triac voltage and the periods of conduction of the triac device 11. The FIG. 5 circuit is similar (except that resistor 43 is adjustable to set the phase angle and resistor 48 is omitted), but does not employ the Zener diodes 45 and 46 to clamp the voltage of the phase control circuit. As a consequence, the diac signal device 47 switches at a higher voltage than is the case for the FIG. 4 circuit, but otherwise has the same operation. Both of these AC phase control circuits cannot be phased ahead of the load power factor angle. It is readily recognized that, as in FIG. 1, the timing reference is provided by the zero crossing of the voltage across capacitor 44, although the timing means is now solely the capacitor voltage instead of being included in the gating circuit 17 in FIG. 1.

In summary, an adjustable speed AC induction motor energized by phase controlled voltage is stabilized without the need for increasing the air gap between the stator and rotor by an AC phase control circuit having a degenerative feedback circuit such that the timing reference capacitor voltage in an RC circuit is modified or changed as a function of the period of conduction of the bidirectional conducting thyristor means or other solid state controlled switching device or devices connected in series with the motor. As a result, the timing of the next gating signal supplied to the switching means is mo u- lated by the cessation of conduction in the previous half-cycle of operation, to achieve substantially equal conduction periods and equal turn-on phase angles. In the foregoing discussion the correction of instability of single phase capacitor run AC induction motors has been emphasized, however the problem of instability is also observed in some conventional (noncapacitor run) polyphase induction motors under certain load conditions and has usefulness to correct this instability also.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United States is:

1. A stabilized adjustable speed drive system comprising
   a power circuit including an alternating current induction motor and at least one bidirectional conducting controlled solid state switching means connected in series circuit relationship between power supply terminals in which appears an alternating current electric potential, a phase control circuit connected between said power supply terminals and to said switching means including timing means for timing the production of gating signals to render conductive said switching means at a preselected phase angle of each half cycle of the electric potential for a period of conduction that terminates when the current in said power circuit falls to approximately zero, and degenerative feedback means comprising an impedance element effectively coupled to a junction between said induction motor and switching means for modifying said timing means as a function of the period of conduction of said switching means in a previous half cycle, whereby the periods of conduction of the switching means and the phase angles at which the gating signals are produced are substantially equal and the motor is stabilized, wherein said phase control circuit includes a series connected resistor and capacitor connected between said power supply terminals which has a time constant that is relatively short so that the voltage across said capacitor and the power supply terminal electric potential are substantially in phase, and said timing means is provided by gating circuit means fabricated as a monolithic integrated circuit and connected across said capacitor such that the capacitor voltage is a timing reference for the timing means.

2. A stabilized adjustable speed drive system comprising a capacitor run alternating current induction motor including two stator windings effectively connected in parallel circuit relationship and a capacitor connected in series circuit relationship with one of the windings, bidirectional conducting thyristor means connected in series circuit relationship with said induction motor, the power circuit comprising said induction motor and thyristor means being connected between a pair of power supply terminals in which appears an alternating current electric potential, a phase control circuit connected to supply gating signals to render conductive said thyristor means at a preselected phase angle of each half cycle of the electric potential for a period of conduction that terminates when the current in said power series circuit falls below the holding current of said thyristor means, said phase control circuit including the series combination of a resistor and capacitor connected between said power supply terminals, wherein the capacitor voltage across said last mentioned capacitor serves as a timing reference for the production of the gating signals, and degenerative feedback means comprising an impedance element effectively coupled between the junction of said induction motor and thyristor means and the junction of the series connected resistor and capacitor for changing the capacitor voltage as a function of the period of conduction of said thyristor means in a previous half cycle, to thereby change the timing reference, whereby the periods of conduction of the thyristor means and the phase angles of the gating signals are substantially equal and the motor is stabilized.

3. A system as set forth in claim 2 wherein the impedance element in said degenerative feedback means is a resistor, and the timing reference is provided by the passage through zero of the capacitor voltage, and the degenerative feedback means changes the zero crossing of the capacitor voltage in a leading sense with respect to the power supply terminal electric potential.

4. A system as set forth in claim 2 wherein said bidirectional conducting thyristor means comprises a triac device, and the impedance element in said degenerative feedback means is a resistor connected directly between the aforesaid junction points.

5. A system as set forth in claim 2 wherein the timing constant of the series connected resistor and capacitor in said phase control circuit is relatively short and the timing reference capacitor voltage is substantially in phase with the power supply terminal electric potential, and said phase control circuit further includes a gating circuit connected across said last mentioned capacitor which in turn includes timing means arranged to commence the timing of the production of the gating signals upon the passage through zero of the timing reference capacitor voltage.

6. A system as set forth in claim 2 wherein the timing constant of the series connected resistor and capacitor in said phase control circuit is relatively short and the timing reference capacitor voltage is substantially in phase with the power supply terminal electric potential, and said phase control circuit further includes a monolithic integrated gating circuit connected across said last mentioned capacitor, said gating circuit in turn comprising timing means arranged to commence timing upon the passage through zero of the timing reference capacitor voltage, means for producing an output signal at the preselected phase angle, and a switching device coupled between said thyristor means and last mentioned capacitor which is turned on by said output signal to thereby apply the gating signal to said thyristor means.

7. A stabilized adjustable speed drive system comprising a power circuit including an alternating current induction motor connected in series circuit relationship with bidirectional conducting controlled solid state switching means between power supply terminals in which appear an alternating current electric potential, a phase control circuit connected to supply gating signals to render conductive said solid state switching means at a selected phase angle of each half cycle of the electric potential for a period of conduction that terminates when the current in said power circuit falls to approximately zero, said phase control circuit including the series combination of a charging capacitor and charging means therefor, wherein the voltage across said charging capacitor serves as a timing reference for the production of gating signals, and a degenerative feedback impedance effectively coupled between the junction of said charging capacitor and charging means and the junction of said induction motor and solid state switching means to provide an additional path for charging said charging capacitor, during intervals of nonconduction of said solid state switching means, s a function of the period of conduction of said solid state switching means in a previous half cycle, to thereby stabilize the motor.

8. A system as set forth in claim 7 wherein the series combination of said charging capacitor and charging means in connected between said power supply terminals, and said charging means comprises a resistor, and said degenerative feedback impedance is a resistor connected directly between the aforesaid junction points.